(12) United States Patent
Stoumbos et al.

(10) Patent No.: US 8,786,561 B2
(45) Date of Patent: Jul. 22, 2014

(54) DISAMBIGUATING INTENTIONAL AND INCIDENTAL CONTACT AND MOTION IN MULTI-TOUCH POINTING DEVICES

(75) Inventors: Christopher Stoumbos, Sammamish, WA (US); John Miller, Redmond, WA (US); Robert Young, Kirkland, WA (US); Hrvoje Benko, Seattle, WA (US); David Perek, Redmond, WA (US); Peter Ansell, Watford (GB); Oyvind Haehre, Loveland, CO (US)

(73) Assignee: Microsoft Corporation, Redmond, WA (US)

( * ) Notice: Subject to any disclaimer, the term of this patent is extended or adjusted under 35 U.S.C. 154(b) by 282 days.

(21) Appl. No.: 13/110,013

(22) Filed: May 18, 2011

(65) Prior Publication Data

US 2012/0293420 A1 Nov. 22, 2012

(51) Int. Cl.
*G06F 3/041* (2006.01)
(52) U.S. Cl.
USPC .......................................................... 345/173
(58) Field of Classification Search
None
See application file for complete search history.

(56) References Cited

U.S. PATENT DOCUMENTS

| | | | |
|---|---|---|---|
| 5,825,352 A | 10/1998 | Bisset | |
| 5,856,822 A | 1/1999 | Du | |
| 5,943,043 A | 8/1999 | Furuhata | |
| 6,323,846 B1 | 11/2001 | Westerman et al. | |
| 6,671,406 B1 | 12/2003 | Anderson | |
| 6,856,259 B1 | 2/2005 | Sharp | |
| 7,254,775 B2 | 8/2007 | Geaghan | |
| 7,295,191 B2 | 11/2007 | Kraus | |
| 7,561,146 B1 | 7/2009 | Hotelling | |
| 7,619,618 B2 | 11/2009 | Westerman | |
| 7,688,455 B2 | 3/2010 | Kim | |
| 8,217,909 B2 | 7/2012 | Young | |
| 2004/0207606 A1 | 10/2004 | Atwood | |

(Continued)

FOREIGN PATENT DOCUMENTS

| KR | 100782431 B1 | 12/2007 |
|---|---|---|
| KR | 1020090042425 A | 4/2009 |

(Continued)

OTHER PUBLICATIONS

Wang, et al., "Detecting and Leveraging Finger Orientation for Interaction with Direct-Touch Surfaces", Retrieved at <<http://research.microsoft.com/en-us/people/xiangc/uist2009_fingerorientation.pdf>>, Proceedings of the 22nd annual ACM symposium on User interface software and technology, Oct. 4-7, 2009, p. 23-32.

(Continued)

*Primary Examiner* — Adam R Giesy
(74) *Attorney, Agent, or Firm* — Jeremy Snodgrass; Sergey Lamansky; Micky Minhas

(57) ABSTRACT

An input device has both a touch sensor and a position sensor. A computer using data from the input device uses the relative motion of a contact on a touch sensor with respect to motion from a position detector to disambiguate intentional from incidental motion. The input device provides synchronized position sensor and touch sensor data to the computer to permit processing the relative motion and performing other computations on both position sensor and touch sensor data. The input device can encode the magnitude and direction of motion of the position sensor and combines it with the touch sensor data from the same time frame, and output the synchronized data to the computer.

20 Claims, 6 Drawing Sheets

(56) References Cited

U.S. PATENT DOCUMENTS

| | | | |
|---|---|---|---|
| 2006/0026521 | A1 | 2/2006 | Hotelling et al. |
| 2006/0071912 | A1 | 4/2006 | Hill |
| 2006/0097991 | A1 | 5/2006 | Hotelling |
| 2007/0018968 | A1 | 1/2007 | Iwamoto |
| 2007/0247435 | A1 | 10/2007 | Benko et al. |
| 2007/0262964 | A1 | 11/2007 | Zotov |
| 2007/0268269 | A1 | 11/2007 | Chang et al. |
| 2008/0062140 | A1 | 3/2008 | Hotelling |
| 2008/0136792 | A1 | 6/2008 | Peng et al. |
| 2008/0158185 | A1 | 7/2008 | Westerman |
| 2008/0309629 | A1 | 12/2008 | Westerman |
| 2009/0174679 | A1 | 7/2009 | Westerman |
| 2009/0179865 | A1 | 7/2009 | Kumar |
| 2010/0020025 | A1 | 1/2010 | Lemort et al. |
| 2010/0020029 | A1 | 1/2010 | Park et al. |
| 2010/0073318 | A1 | 3/2010 | Hu |
| 2010/0177042 | A1 | 7/2010 | Chen |
| 2010/0242274 | A1 | 9/2010 | Rosenfeld et al. |
| 2010/0315372 | A1 | 12/2010 | Ng |
| 2010/0321316 | A1 | 12/2010 | Homma |
| 2011/0012840 | A1* | 1/2011 | Hotelling et al. ............. 345/173 |
| 2011/0141054 | A1 | 6/2011 | Wu |
| 2011/0157025 | A1 | 6/2011 | Hoover et al. |
| 2011/0261058 | A1* | 10/2011 | Luo ................................ 345/441 |
| 2011/0304577 | A1 | 12/2011 | Brown |
| 2012/0075331 | A1 | 3/2012 | Mallick |
| 2012/0105334 | A1 | 5/2012 | Aumiller |

FOREIGN PATENT DOCUMENTS

| | | |
|---|---|---|
| KR | 1020090065040 A | 6/2009 |
| KR | 102011011337 A | 2/2011 |
| KR | 1020110018569 A | 2/2011 |
| WO | 2010148483 A1 | 12/2010 |

OTHER PUBLICATIONS

"Magic Mouse", Retrieved at <<http://www.apple.com/magicmouse/>>, Retrieved Date: Mar. 3, 2011, pp. 3.

"International Search Report", Mailing Date: Dec. 27, 2012, Application No. PCT/US2012/038317, Filed Date: May 17, 2012, pp. 9.

Tsuchiya, et al., "Vib-Touch: Virtual active touch interface for handheld devices", Retrieved at <<http://www.mech.nagoya-u.ac.jp/asi/en/member/shogo_okamoto/papers/tsuchiyaROMAN2009.pdf>>, The 18th IEEE International Symposium on Robot and Human Interactive Communication, Sep. 27-Oct. 2, 2009, pp. 12-17.

Cao, et al., "ShapeTouch: Leveraging contact shape on interactive surfaces", Retrieved at <<http://www.cs.toronto.edu/~caox/tabletop2008_shapetouch.pdf>>, Third IEEE International Workshop on Tabletops and Interactive Surfaces (Tabletop), Oct. 1-3, 2008, pp. 139-146.

Benko, et al., "Precise selection techniques for multi-touch screens", Retrieved at <<http://research.microsoft.com/en-us/um/people/benko/publications/2006/Benko-CHI06_Precise%20Selection%20Techniques%20for%20Multi-Touch%20Screens.pdf>>, CHI Conference on Human Factors in Computing Systems, Apr. 22-27, 2006, pp. 10.

"Resolving Merged Touch Contacts", U.S. Appl. No. 12/941,693, filed Nov. 8, 2010, pp. 1-22.

"International Search Report", Mailed Date: Nov. 29, 2012, Application No. PCT/US2012/038735, Filed Date: May 19, 2012, pp. 12.

First office action in U.S. Appl. No. 13/114,060, mailed Nov. 30, 2012.

Second office action in U.S. Appl. No. 13/114,060, mailed Jun. 21, 2013.

Third office action in U.S. Appl. No. 13/114,060, mailed Dec. 17, 2013.

Westerman, Wayne. "Hand tracking, finger identification and chordic manipulation on a multi-touch surface". PhD. Thesis, University of Delaware, dated 1999.

First office action in U.S. Appl. No. 12/941,693, mailed Jul. 18, 2012.

Second office action in U.S. Appl. No. 12/941,693, mailed Nov. 26, 2012.

Third office action in U.S. Appl. No. 12/941,693, mailed May 16, 2013.

Fourth office action in U.S. Appl. No. 12/941,693, mailed Nov. 18, 2013.

Dang et al., "Hand Distinction for Multi-Touch Tabletop Interaction", Retrieved at <<mm-werkstatt.informatik.uni-augsburg.de/files/publications/259/tabletop-dang.pdf>>, Proceedings of the ACM International Conference on Interactive Tabletops and Surfaces, Nov. 23-25, 2009, pp. 8.

"International Search Report" Mailed Mar. 28, 2012, Application PCT/US2011/058855, Filed Nov. 1, 2011, pp. 8 corresponding to U.S. Appl. No. 12/941,693.

\* cited by examiner

DISAMBIGUATING INTENTIONAL AND INCIDENTAL CONTACT AND MOTION IN MULTI-TOUCH POINTING DEVICES

BACKGROUND

A class of computer input devices, called multi-touch pointing devices, includes devices that have both a position sensor and a touch sensor. A user holds the device and moves it around to provide position input, such as with a typical mouse. The user also touches the device on its touch sensor to provide touch input. The touch input can be interpreted as gestures. Information about the position, touch input and possibly gestures are provided as inputs to applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Because the user touches a multi-touch pointing device both to move it and to provide touch input to the touch sensor, it can be difficult to disambiguate intentional contact and motion from incidental contact and motion on the touch sensor.

For example, if the user forms a stroke with a finger as part of a gesture, then that contact and motion on the touch sensor is intentional. However, if the user's fingertip rolls on the touch sensor when the user moves the mouse, then that contact and motion on the touch sensor is incidental, but still appears on the touch sensor as contact and motion.

If the ambiguity between intentional and incidental finger contact and motion on a multi-touch pointing device is not resolved well, then many unintended gestures will be erroneously reported, and the application relying on such gestures will provide a bad user experience. This problem is exacerbated if the multi-touch pointing device is a mouse with a touch sensor, because many users manipulate a mouse by keeping the base of the hand firmly planted on a surface, and push the mouse with the fingertips. This kind of manipulation of a mouse results in a rolling motion of the fingertips, which appears on a touch sensor as moving contacts.

To assist in disambiguating intentional and incidental finger contact and motion, the computer uses the relative motion of a contact on the touch sensor with respect to motion from the position detector. For example, if motion of a contact detected on the touch sensor is in the same direction as motion of the position sensor, then the contact and motion in the touch sensor is likely intentional. However, if motion of a contact detected on the touch sensor is in the opposite direction as motion of the position sensor, then the contact and motion in the touch sensor is likely incidental.

To permit processing of relative motion and performing other computations on both position sensor and touch sensor data, the multi-touch position sensor provides synchronized position sensor and touch sensor data to the computer. In one implementation, the input device encodes the magnitude and direction of motion of the position sensor and combines it with the touch sensor data from the same time frame, and outputs the synchronized data, for example to a computer.

Accordingly, in one aspect, a computing machine has an input device having a touch sensor and a position sensor. A memory stores information describing motion of a contact on the touch sensor and information describing motion of the position sensor from the input device. A processing device includes a comparator having a first input for receiving information describing the motion of the contact on the touch sensor and a second input for receiving information describing the motion of the position sensor, and an output providing a comparison result. The comparison result can be used by an application to decide whether motion of a contact is incidental or intentional.

In another aspect, an article of manufacture includes a computer storage medium and computer program instructions stored on the computer storage medium. Such instructions, when processed by a processing device, instruct the processing device to perform a process. This process involves receiving touch sensor data from a touch sensor and position data from a position sensor into memory. The processing device compares motion of a contact on the touch sensor with motion of the position sensor, to provide the comparison result.

In another aspect, a computer-implemented process involves receiving touch sensor data from a touch sensor and position data from a position sensor into memory. The processing device compares motion of a contact on the touch sensor with motion of the position sensor, to provide the comparison result.

In some embodiments, if motion of a contact is the same direction as motion of the position sensor, then motion of the contact can be indicated as intentional. If motion of a contact is an opposite direction as motion of the position sensor, then motion of the contact can be indicated as incidental. The received touch sensor data and position data preferably from the same time frame. The received position sensor data may be data describing a direction and magnitude of motion of the position sensor.

In another aspect, a multi-touch pointing device includes a touch sensor having an output, a position sensor having an output and a processing device. The processing device synchronizes information about the output of the position sensor and the output of the touch sensor from the same time frame, to provide an output of the multi-touch pointing device. In one embodiment, the processing device includes a motion calculator and a synchronization module. The motion calculator has a first input for receiving the position sensor data for a first sample time and a second input for receiving the position sensor data for a second sample time and an output providing an encoding of a direction of motion of the position sensor. The synchronization module has a first input for receiving the output of the touch sensor and a second input for receiving the output of the motion calculator and an output providing the output of the multi-touch pointing device. In one embodiment, the touch sensor data and position sensor data are provided as the output. In another embodiment, motion of the position sensor and touch sensor data are provided as the output.

In the following description, reference is made to the accompanying drawings which form a part of this disclosure, and in which are shown, by way of illustration, specific example implementations. It is understood that other implementations may be made without departing from the scope of the disclosure.

DETAILED DESCRIPTION

The following section provides an example operating environment in which such a multi-touch pointing device can be used.

Figure 1:
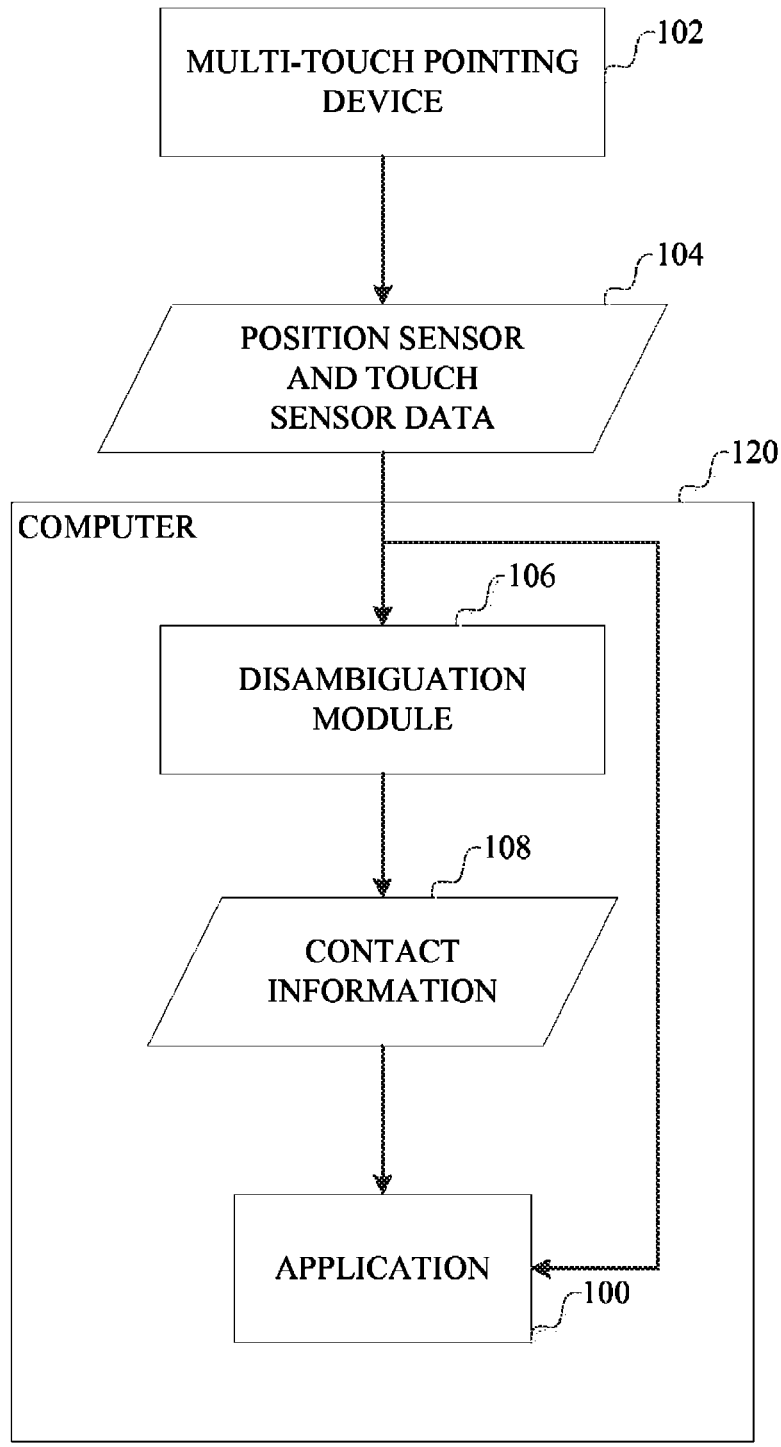
FIG. 1 is a block diagram of an example operating environment in which a multi-touch pointing device can be used.

Referring to FIG. 1, an application 100 running on a computer 120 is responsive to user inputs from a multi-touch pointing device 102. The device 102 provides position sensor and touch sensor data 104 to the computer 120. The computer 120 includes a disambiguation module 106, typically implemented as within a dynamically-linked library for the device 102 running as a user-level process on the computer 120. In one implementation in which the device 102 is a universal serial bus (USB) device of the human interface device (HID) class, this library receives data provided by a driver for that class of device. The disambiguation module 106 receives the data 104 from the device 102 and provides contact information 108, indicative of what the computer believes is intentional contact and motion on the touch sensor. The contact information 108 is based, at least on part, on disambiguating intentional from incidental contact and motion on the touch sensor, using direction and magnitude of motion of the position sensor.

To assist in disambiguating intentional and incidental finger contact and motion, the disambiguation module uses the relative motion of a contact on the touch sensor with respect to motion from the position detector. For example, if motion of a contact detected on the touch sensor is in the same direction as motion of the position sensor, then the contact motion in the touch sensor is likely intentional. However, if motion of a contact detected on the touch sensor is in the opposite direction as motion of the position sensor, then the contact motion on the touch sensor is likely incidental.

Given this context, an example implementation of the disambiguation module 106 will now be described in more detail in connection with FIGS. 2-4. In this implementation, the disambiguation module is implemented as a computer program running on a computer, as a user-level process, which processes motion data from a position sensor and touch sensor data. Other implementations are possible. For example, the disambiguation module can reside in the input device itself. In such an implementation, the input device includes firmware in a processing device to implement the disambiguation module. This module provides the touch sensor information and other data indicative of relative motion between contacts on the touch sensor and the position sensor.

Figure 2:
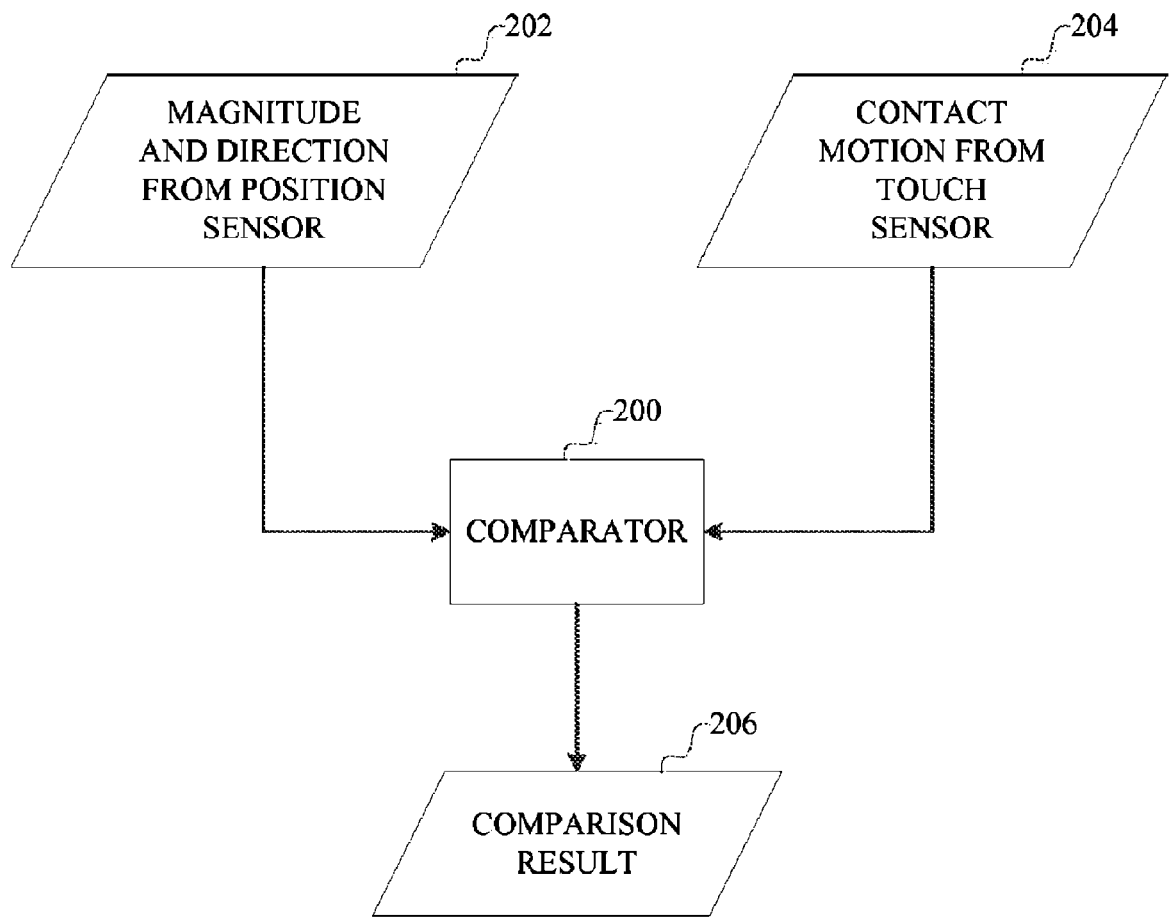
FIG. 2 is a data flow diagram illustrating an example implementation of disambiguation of intentional and incidental contact and motion.

In FIG. 2, a comparator 200 has a first input that receives information 202 describing the motion of a contact on the touch sensor. This information can be, for example, an output of a contact detection algorithm that identifies contacts on a touch sensor and tracks their motion over time. A contact can be characterized by an identifier and by an x/y coordinate or other description such as a bounding box, pixel weight, pixel count or other characteristic feature of the contact. A second input receives information 204 describing motion of the position sensor. The information describing the motion of the position sensor can be, for example, a direction and magnitude of the motion. Alternatively, this information can be any data that enables the motion of the position sensor to be calculated, such as current and prior position data. The comparator can implement the comparison in a number of ways. Any mathematical function that can be applied to the contact motion and the position sensor motion to determine whether a contact and the position sensor are moving in the same direction or the opposite direction can be used. For example, if the difference in direction is within a threshold, then the direction could be deemed to be the same. As another example, the signs of the directions of movement in the x or y axes can be compared. In another implementation, the contact motion could be adjusted by the position sensor motion. That is, the position sensor motion could be subtracted from the contact motion. The output of the comparator 200 is a comparison result 206.

The inputs representative of motion of the position sensor and motion of contacts on the touch sensor can be derived in a number of ways. One example implementation is shown in FIG. 3.

Figure 3:
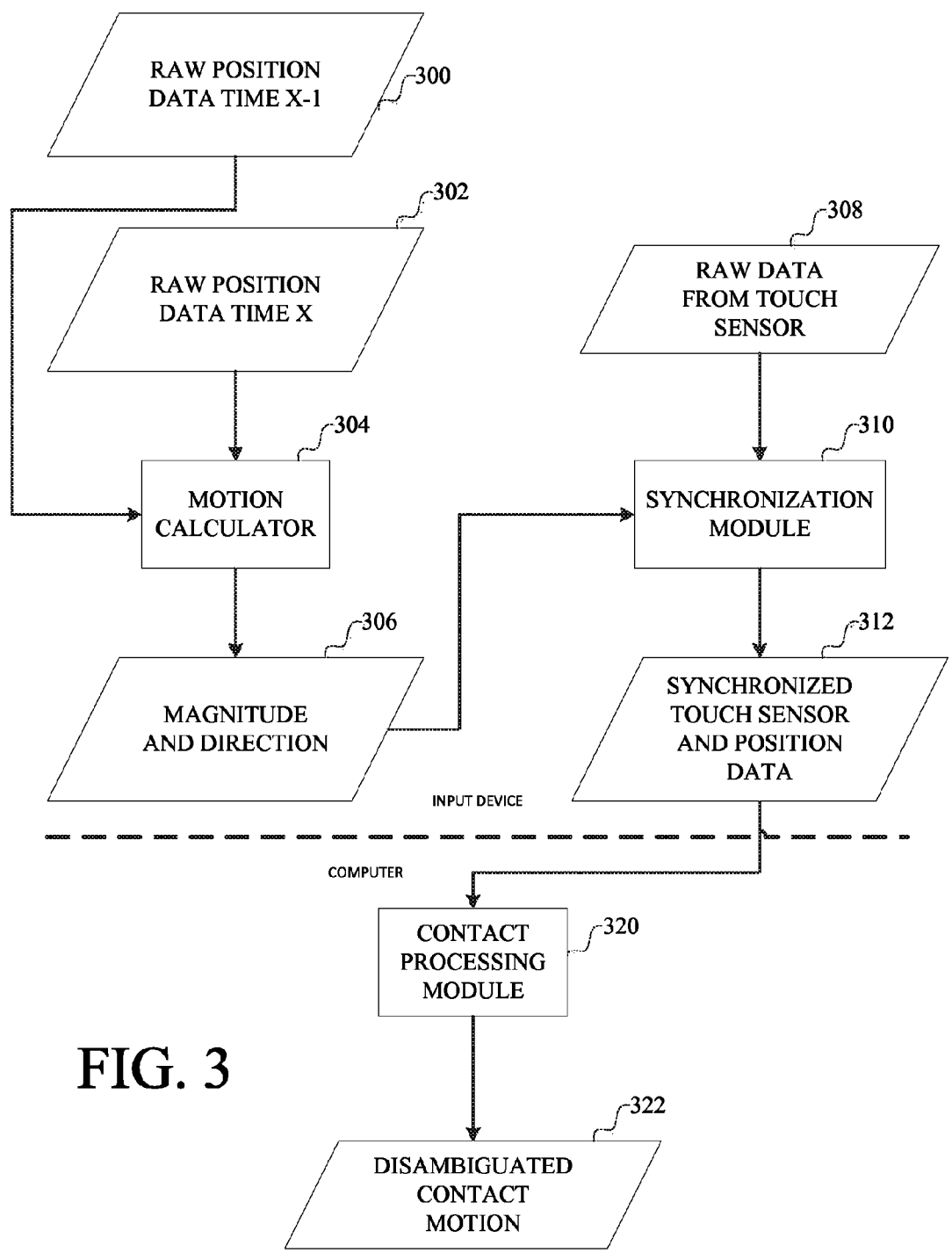
FIG. 3 is a data flow diagram illustrating an example implementation of how the motion data in FIG. 2 can be derived.

FIG. 3 is a data flow diagram for processing data from position and touch sensors in an input device. In this implementation, the contact processing module 320 resides in a computer, whereas the other modules reside in the input device.

In the input device, raw position data from the position sensor at times X and X−1 are stored, as indicated at 300 and 302. The position data from two different times can be used to calculate motion, by a motion calculator 304. The motion calculator can be implemented in a variety of ways to provide information describing the motion detected by the position sensor, such as a magnitude and direction of the motion, as indicated at 306. A synchronization module 310 synchronizes the motion data with the touch sensor data 308 from the same time frame, providing synchronized touch sensor and position data 312.

One of the purposes of the synchronization module 310 is to ensure that the computer receives position sensor data and touch sensor data from the same time frame. The time frame is the period of time over which motion of the position sensor is calculated. Touch sensor data that is obtained during this time frame is within the same time frame. By synchronizing the motion information and touch sensor information from the same time frame, their relative directions and magnitudes can be compared. In the computer, a contact processing module 320 has an input that receives the synchronized touch sensor and position sensor data 312, and an output that provides the disambiguated contact motion 322. As an example, this contact processing module 320 can be implemented so as to include a comparator according to the data flow diagram of FIG. 2. For each contact, the comparator information can be used to indicate whether motion of the contact is incidental or intentional.

Having now described generally an example operation of such contact disambiguation, a specific example will now be described.

There are a variety of ways to provide motion information from the position sensor in a manner that is synchronized with the touch sensor data from the same time frame. In one example described below, the magnitude and direction of the motion at time X is encoded as a value, and then combined with the touch sensor data before being transmitted from the input device to the computer.

In a particular implementation, a five (5) pixel by five (5) pixel touch sensor, with four (4) bits of data per pixel, provides one hundred (100) bits of touch sensor data. An additional four (4) bits of data is available in the thirteen (13) bytes used to store the touch sensor data. The position sensor data can be encoded in these four bits. The number of bits used to represent the position sensor data and the touch sensor data depends on the resolution (i.e., number of pixels and pixel depth) of the touch sensor, the desired format and resolution of the position sensor information, and the available number of bits that can be transmitted from the input device to the host.

Figure 4:
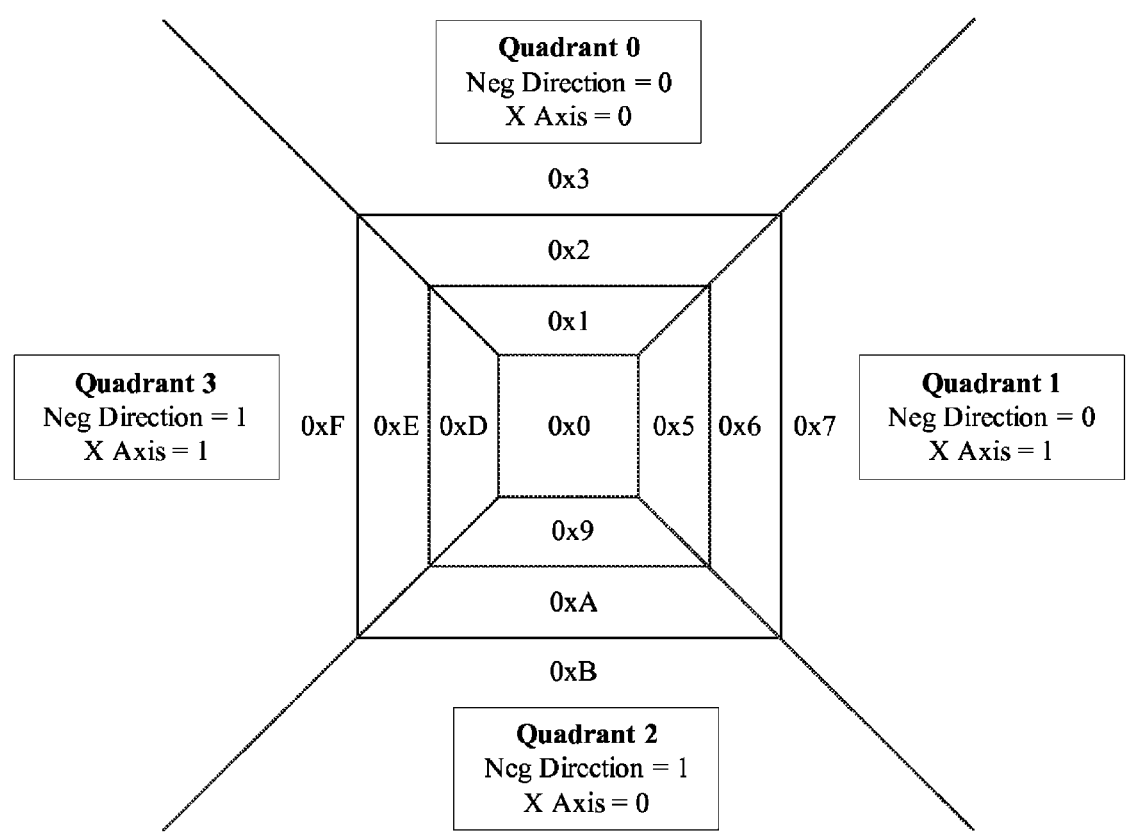
FIG. 4 is a diagram describing an example of encoding position sensor data.

For example, as shown in FIG. 4, if the motion of the position sensor can be represented by a direction, encoded by two binary values, and a magnitude representing the velocity, also encoded in two bits, with the value 0 representing an insignificant amount of motion. The direction is encoded by one value that represents whether the direction is negative or positive from an origin, and another value that represents whether the direction is primarily on the x axis or the y axis. For example, for motion primarily in the positive Y direction (Quadrant 0), the two binary values would be, e.g., negative=0, x direction=0, which, combined with the magnitude values, results in possible values of, e.g., 0x0, 0x1, 0x2 or 0x3 in hexadecimal format. If the motion of the position sensor is primarily in the positive X direction (Quadrant 2), then the two binary values would be, e.g., negative=0, x direction=1, which, combined with the magnitude values, results in possible values of, e.g., 0x4, 0x5, 0x6 or 0x7. If the motion of the position sensor is primarily in the negative Y direction (Quadrant 2), then the two binary values would be, e.g., negative=1, x direction=0, which, combined with the magnitude values, results in possible values of, e.g., 0x8, 0x9, 0xA or 0xB. If the motion of the position sensor is primarily in the negative X direction (Quadrant 3), then the two binary values would be, e.g., negative=1, x direction=1, which, combined with the magnitude values, results in possible values of, e.g., 0xC, 0xD, 0xE or 0xF.

Table I represents the encoding of the position data in the last four (4) bits of a byte of touch sensor data:

| Encoding | Sign Bit Quadrant Negative Direction | Axis Bit X Axis | Velocity Bits Magnitude | Notes |
|---|---|---|---|---|
| 0x0 | 0 | 0 | 00 | No Velocity |
| 0x1 | 0 | 0 | 01 | Increasing Y, Slow |
| 0x2 | 0 | 0 | 10 | Increasing Y, Med |
| 0x3 | 0 | 0 | 11 | Increasing Y, Fast |
| 0x4 | 0 | 1 | 00 | No Velocity |
| 0x5 | 0 | 1 | 01 | Increasing X, Slow |
| 0x6 | 0 | 1 | 10 | Increasing X, Med |
| 0x7 | 0 | 1 | 11 | Increasing X, Fast |
| 0x8 | 1 | 0 | 00 | No Velocity |
| 0x9 | 1 | 0 | 01 | Decreasing Y, Slow |
| 0xA | 1 | 0 | 10 | Decreasing Y, Med |
| 0xB | 1 | 0 | 11 | Decreasing Y, Fast |
| 0xC | 1 | 1 | 00 | No Velocity |
| 0xD | 1 | 1 | 01 | Decreasing X, Slow |
| 0xE | 1 | 1 | 10 | Decreasing X, Med |
| 0xF | 1 | 1 | 11 | Decreasing X, Fast |

Figure 5:
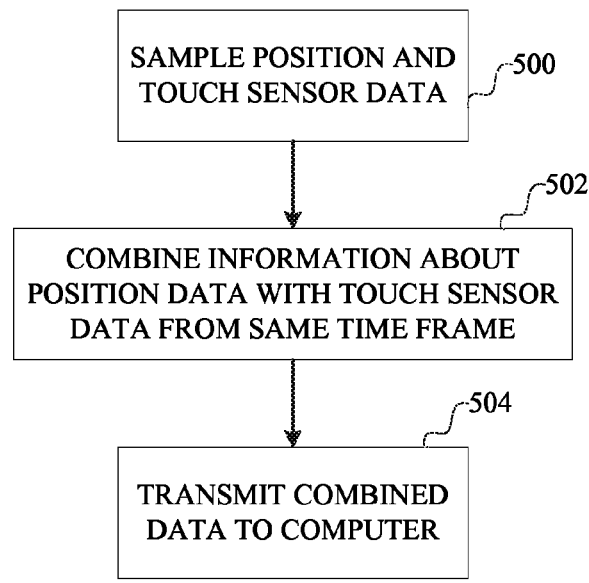
FIG. 5 is a flow chart describing operation of an example input device.

Referring now to FIG. 5, an example operation of an example input device will now be described. The position and touch sensor data is sampled (500). For example, this may include periodically sampling at regular time intervals, the outputs provided by each of the position sensor and the touch sensor. Information about the position data, which may include the position sensor data itself or information derived from the position sensor data such as an encoded direction and magnitude, is combined (502) with the touch sensor data from the same time frame. The combined data is transmitted (504) to the computer. For example, this may be transmitted over a serial bus, wireless connection or other interface between the input device and the computer.

Figure 6:
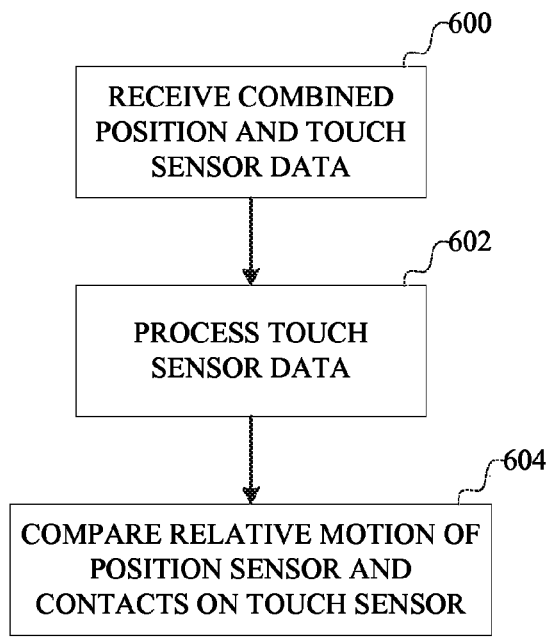
FIG. 6 is a flow chart describing an example operation of a computer using the input device.

Referring now to FIG. 6, the computer receives (600) the combined position and touch sensor data over the interface between the input device and the computer. The computer may extract the data and store it in memory accessible to an application (such as a driver) that will process the data. The touch sensor data is processed (602) to identify contacts on the touch sensor and otherwise characterize the contacts on the touch sensor. In particular, the apparent motion of each contact on the touch sensor can be derived. The relative motion of the position sensor and the contacts on the touch sensor is compared (604), as described above, to disambiguate the motion between intentional and incidental. A value associated with the motion of the contact on the touch sensor can be stored to indicate this conclusion.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
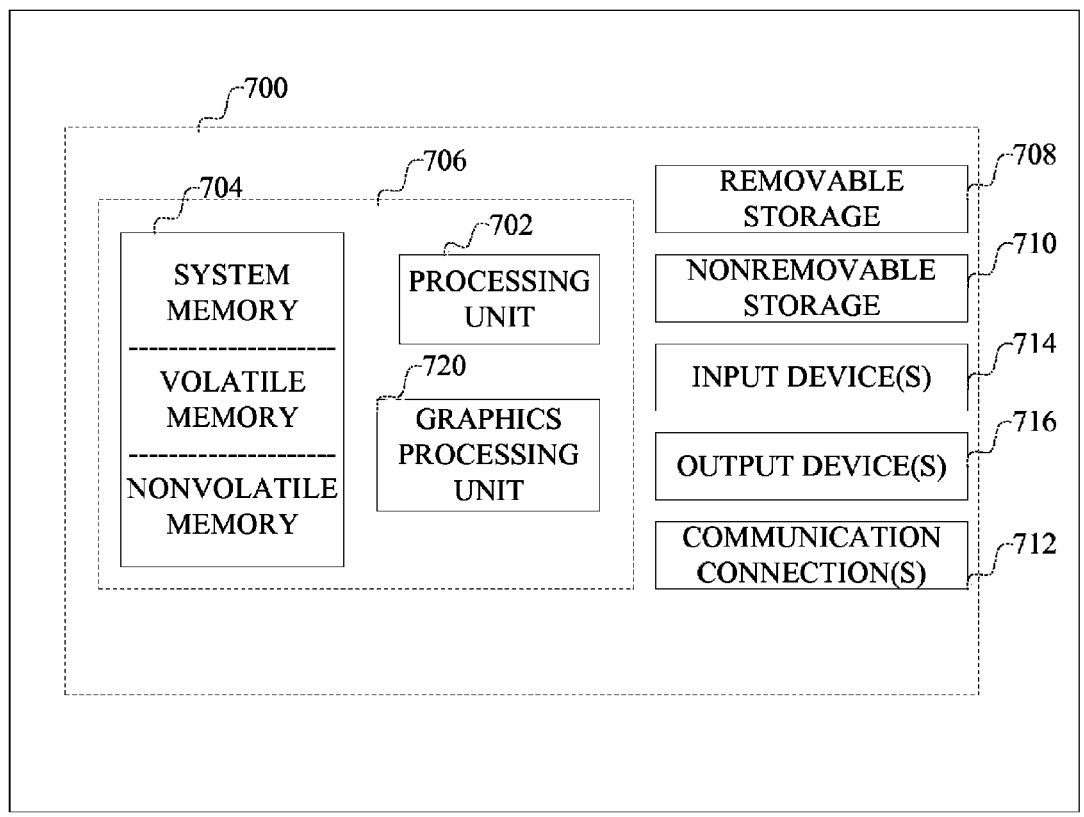
FIG. 7 is a block diagram of an example computing machine in which such a system can be implemented.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing machine, such as computing machine 700. In its most basic configuration, computing machine 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing machine 700 may also have additional features/functionality. For example, computing machine 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 700. Any such computer storage media may be part of computing machine 700.

Computing machine 700 may also contain communications connection(s) 712 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 700 may have various input device(s) 714 such as a display, a keyboard, mouse, pen, camera, touch input device, and so on. Output device(s) 716 such as speakers, a printer, and so on may also be included. All of these devices are well known in the art and need not be discussed at length here.

The system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

The invention claimed is:

1. A process comprising: receiving touch sensor data from a touch sensor on a device and position data from a position sensor indicating movement of the device into memory; comparing, with a processing device, motion of a contact on the touch sensor with direction of motion of the device indicated by the position sensor, to provide a comparison result; and providing information about the contact on the touch sensor based on the comparison result.

2. The process of claim 1, wherein if motion of a contact is the same direction as motion of the device indicated by the position sensor, then motion of the contact is indicated as intentional.

3. The process of claim 2, wherein if motion of a contact is an opposite direction as motion of the device indicated by the position sensor, then motion of the contact is indicated as incidental.

4. The process of claim 1, wherein if motion of a contact is an opposite direction as motion of the device indicated by position sensor, then motion of the contact is indicated as incidental.

5. The process of claim 1, wherein the received touch sensor data and position data are from the same time frame.

6. The process of claim 1, wherein the received position sensor data comprises data describing a direction and magnitude of motion of the device.

7. A multi-touch pointing device, comprising: a touch sensor on the pointing device having an output indicating contact with the touch sensor; a position sensor having an output indicating direction of movement of the pointing device; and a processing device having inputs connected to receive the outputs of the touch sensor and the position sensor, and synchronizing information about the output of the position sensor and the output of the touch sensor from the same time frame, to provide an output of the multi-touch pointing device.

8. The multi-touch pointing device of claim 7, wherein the processing device comprises:
   a motion calculator having a first input for receiving the position sensor data for a first sample time and a second input for receiving the position sensor data for a second sample time and an output providing an encoding of a direction of motion of pointing device indicated by the position sensor, and
   a synchronization module having a first input for receiving the output of the touch sensor and a second input for receiving the output of the motion calculator from the same time frame and an output providing the synchronized inputs as the output of the multi-touch pointing device.

9. The multi-touch pointing device of claim 8, wherein the information about the output of the position sensor comprises motion of the pointing device.

10. The multi-touch pointing device of claim 8 wherein the output of the motion calculator encodes direction and magnitude of motion of the pointing device.

11. The multi-touch pointing device of claim 7, wherein the information about the output of the position sensor comprises motion of the pointing device.

12. The multi-touch pointing device of claim 7, wherein the synchronized information comprises a direction of motion of the pointing device and data output from the touch sensor.

13. A computing machine comprising: a memory for storing information describing motion of a contact on a touch sensor on an input device and information describing motion of the input device indicated by a position sensor on the input device; a processing device including a comparator having a first input for receiving information describing the motion of the contact on the touch sensor and a second input for receiving information describing direction of the motion of the input device from the position sensor, and an output providing a comparison result.

14. The computing machine of claim 13, wherein if motion of a contact is the same direction as motion of the input device indicated by the position sensor, then motion of the contact is indicated as intentional.

15. The computing machine of claim 14, wherein if motion of a contact is an opposite direction as motion of the input device indicated by the position sensor, then motion of the contact is indicated as incidental.

16. The computing machine of claim 15, wherein the information describing motion of a contact on the touch sensor data and the information describing motion of the input device are from the same time frame.

17. The computing machine of claim 13, wherein if motion of a contact is an opposite direction as motion of the input device indicated by the position sensor, then motion of the contact is indicated as incidental.

18. The computing machine of claim 13, wherein the information describing motion of a contact on the touch sensor data and the information describing motion of the input device are from the same time frame.

19. The computing machine of claim 18, wherein the information describing motion of the input device comprises data describing a direction and magnitude of motion.

20. The computing machine of claim 13, wherein the information describing motion of the input device comprises data describing a direction and magnitude of motion.

* * * * *